(12) United States Patent
Kwon et al.

(10) Patent No.: US 10,296,405 B2
(45) Date of Patent: May 21, 2019

(54) NONVOLATILE MEMORY SYSTEM AND ERROR DETERMINATION METHOD THEREOF

(71) Applicant: SK hynix Inc., Icheon-si, Gyeonggi-do (KR)

(72) Inventors: Jung Hyun Kwon, Icheon-Si (KR); Sung Eun Lee, Icheon-Si (KR); Jae Sun Lee, Icheon-Si (KR); Jingzhe Xu, Icheon-Si (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 171 days.

(21) Appl. No.: 15/434,314

(22) Filed: Feb. 16, 2017

(65) Prior Publication Data

US 2018/0011754 A1    Jan. 11, 2018

(30) Foreign Application Priority Data

Jul. 5, 2016   (KR) .......................... 1020160084855
Nov. 25, 2016  (KR) .......................... 1020160158387

(51) Int. Cl.
  *G06F 11/10*  (2006.01)
  *G06F 11/07*  (2006.01)

(52) U.S. Cl.
  CPC ...... *G06F 11/0727* (2013.01); *G06F 11/1048* (2013.01); *G06F 11/0793* (2013.01)

(58) Field of Classification Search
  CPC ....... G06F 11/07; G06F 11/0727; G06F 11/11
  USPC .......................................................... 714/32
  See application file for complete search history.

(56) References Cited

U.S. PATENT DOCUMENTS

| | | | | |
|---|---|---|---|---|
| 4,371,930 A * | 2/1983 | Kim | ...................... | G06F 11/073 714/54 |
| 4,535,455 A * | 8/1985 | Peterson | ............... | G06F 11/073 714/48 |
| 4,541,092 A * | 9/1985 | Sako | ..................... | H03M 13/15 714/756 |
| 4,598,402 A * | 7/1986 | Matsumoto | ............ | G11C 29/88 714/54 |
| 4,604,750 A * | 8/1986 | Manton | ............... | G06F 11/1048 714/48 |
| 4,604,751 A * | 8/1986 | Aichelmann, Jr. | ......................... | G06F 11/1024 714/723 |
| 4,608,687 A * | 8/1986 | Dutton | ................ | G06F 11/1024 714/710 |

(Continued)

FOREIGN PATENT DOCUMENTS

KR   1020050108978 A    11/2005
KR   1020110001071 A    1/2011

*Primary Examiner* — Kamini B Patel
(74) *Attorney, Agent, or Firm* — William Park & Associates Ltd.

(57) ABSTRACT

A memory system may be provided. The memory system may include a memory apparatus including a plurality of memory cells. The memory system may include and a controller configured to control a write operation and a read operation with respect to the memory apparatus, detect an error occurrence position by performing the write operation and the read operation on a corresponding region of the memory apparatus in which an error occurs based on error occurrence address information generated in the read operation while changing a level of data to be written, and determine a type of error based on the detected error occurrence position.

14 Claims, 6 Drawing Sheets

(56) References Cited

U.S. PATENT DOCUMENTS

| | | | | |
|---|---|---|---|---|
| 4,694,454 A | * | 9/1987 | Matsuura | G06F 11/106 365/22 |
| 4,698,810 A | * | 10/1987 | Fukuda | G11B 20/1809 360/32 |
| 4,701,915 A | * | 10/1987 | Kitamura | G06F 9/26 714/6.24 |
| 4,827,478 A | * | 5/1989 | Chan | G06F 11/10 714/763 |
| 4,964,129 A | * | 10/1990 | Bowden, III | G06F 11/073 714/704 |
| 4,964,130 A | * | 10/1990 | Bowden, III | G06F 11/073 714/704 |
| 5,072,450 A | * | 12/1991 | Helm | G06F 11/073 714/723 |
| 5,291,496 A | * | 3/1994 | Andaleon | G06F 11/10 714/703 |
| 5,953,351 A | * | 9/1999 | Hicks | G06F 11/1024 714/48 |
| 6,044,479 A | * | 3/2000 | Dell | G06F 11/1044 714/48 |
| 6,560,725 B1 | * | 5/2003 | Longwell | G06F 11/073 711/105 |
| 6,701,480 B1 | * | 3/2004 | Karpuszka | G06F 11/1056 714/764 |
| 8,032,816 B2 | * | 10/2011 | Spanel | G06F 11/1012 714/765 |
| 2003/0037280 A1 | * | 2/2003 | Berg | G06F 11/073 714/6.12 |
| 2018/0217894 A1 | * | 8/2018 | Park | G06F 11/1056 |
| 2018/0232267 A1 | * | 8/2018 | Koo | G06F 11/076 |

\* cited by examiner

NONVOLATILE MEMORY SYSTEM AND ERROR DETERMINATION METHOD THEREOF

CROSS-REFERENCES TO RELATED APPLICATION

This application claims priority under 35 U.S.C. 119(a) to Korean application No. 10-2016-0084855, filed on Jul. 5, 2016, and No. 10-2016-0158387, filed on Nov. 25, 2016, in the Korean intellectual property Office, which is incorporated by reference in its entirety as set forth in full.

BACKGROUND

1. Technical Field

Various embodiments may generally relate to a semiconductor apparatus, and more particularly, to a nonvolatile memory system and an error determination method thereof.

2. Related Art

When data is read from a memory apparatus, a data error may occur due to various factors.

There are soft errors, which temporarily occur in the memory apparatus, then there are hard errors, which occurs when a memory cell is permanently damaged or the memory cell cannot store normal information, and the like as the data error.

Error correction technology may be used to overcome the data errors and to prevent data loss. The error correction technology may refer to technology which determines whether or not an error has occurred based on data output from a memory cell and parity information, and corrects the error in a read operation. The error correction may be performed through an error checking and correction (ECC) circuit.

The errors detected through the ECC circuit may include the soft error, which is correctable and the hard error, which is uncorrectable. An appropriate operation, for example, an error correction operation or a repair operation may be performed according to a type of error and the number of error occurrences according to an address.

SUMMARY

According to an embodiment, there may be provided a memory system. The memory system may include a memory apparatus including a plurality of memory cells. The memory system may include a controller configured to control a write operation and a read operation with respect to the memory apparatus, detect an error occurrence position by repeatedly performing the write operation and the read operation on a corresponding region of the memory apparatus in which an error occurs based on error occurrence address information generated in the read operation while changing a level of data to be written, and determine a type of error based on the detected error occurrence position.

According to an embodiment, there may be provided a nonvolatile memory system. The nonvolatile memory system may include an error checking and correction (ECC) circuit configured to generate error occurrence address information according to a read result of a nonvolatile memory apparatus. The nonvolatile memory system may include an error determination circuit configured to receive the error occurrence address information, detect an error occurrence position by repeatedly performing a write operation and a read operation on the nonvolatile memory apparatus corresponding to the error occurrence address information while changing a level of data to be written, and determine a type of error based on the detected error occurrence position.

According to an embodiment, there may be provided an error determination method of a memory system. The method may include reading data from a memory apparatus according to control of a controller in a normal read operation. The method may include generating error occurrence address information based on a read result in the controller. The method may include detecting an error occurrence position by repeatedly performing a write operation and a read operation on a corresponding region of the memory apparatus in which an error occurs in the controller based on the error occurrence address information while changing a level of data to be written and determining a type of error based on the detected error occurrence position.

DETAILED DESCRIPTION

Figure 1:
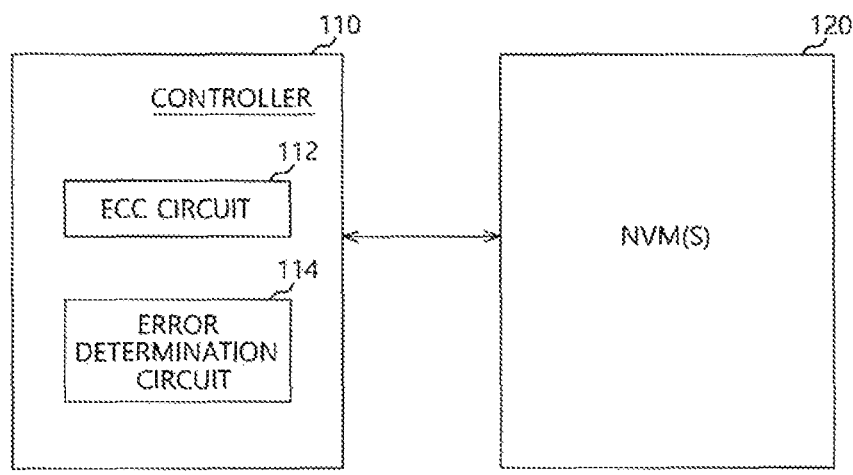
FIG. 1 is a configuration diagram illustrating a representation of an example of a nonvolatile memory system according to an embodiment.

Various examples of embodiments will be described below with reference to the accompanying drawings. Various examples of embodiments are described herein with reference to cross-sectional illustrations that are schematic illustrations of examples of embodiments (and intermediate structures). As such, variations from the shapes of the illustrations as a result, for example, of manufacturing techniques and/or tolerances, are to be expected. Thus, embodiments should not be construed as limited to the particular shapes illustrated herein but may include deviations in shapes that result, for example, from manufacturing. In the drawings, lengths and sizes of layers and regions may be exaggerated for clarity. Like reference numerals in the drawings denote like elements. It is also to be understood that when a layer is referred to as being "on" another layer or substrate, it can be directly on the other or substrate, or intervening layers may also be present. It is also noted that in this specification, "connected/coupled" refers to one component not only directly coupling another component but also indirectly coupling another component through an intermediate component. In addition, a singular form may include a plural form, and vice versa as long as it is not specifically mentioned.

The disclosure is described herein with reference to cross-section and/or plan illustrations of examples of embodiments of the disclosure. However, embodiments of the disclosure should not be construed as limiting the disclosure. Although a few embodiments of the disclosure will be illustrated and described, it will be appreciated by those of ordinary skill in the art that changes may be made in these examples of embodiments without departing from the principles and spirit of the disclosure.

FIG. 1 is a configuration diagram illustrating a representation of an example of a nonvolatile memory system according to an embodiment.

Referring to FIG. 1, a nonvolatile memory system 10 according to an embodiment may include a controller 110 and a memory apparatus 120.

The controller 110 may control an overall operation of the nonvolatile memory system 10 to exchange data between a host apparatus (not illustrated) and the memory apparatus 120.

The controller 110 may include an error checking and correction (ECC) circuit 112 and an error determination circuit 114.

The ECC circuit 112 may be configured to check and correct an error in a read operation with respect to the memory apparatus 120. The ECC circuit 112 may output error occurrence address information corresponding to an error when the error occurs as a result of the ECC operation. The error occurrence address information may include, for example, a row address and error bit position information.

The error determination circuit 114 may be configured to receive the error occurrence address information output from the ECC circuit 112 and determine a type of error by accessing the memory apparatus 120 based on the received error occurrence address information. In an aspect, the error determination circuit 114 may be configured to determine whether the error of the memory apparatus 120 corresponding to the corresponding to the error occurrence address information is a soft error or a hard error as the error occurrence address information is provided from the ECC circuit 112. In an embodiment, the error determination circuit 114 may be realized through a processor, circuitry, or a combination of the two.

The soft error may refer to an error which temporarily occurs in a memory cell (or memory cells) included in the memory apparatus 120, and the soft error may include an error to be correctable and an error to be uncorrectable by the ECC circuit 112 according to performance of the ECC circuit 112.

The hard error may refer to an error which occurs when a memory cell (or memory cells) included in the memory apparatus 120 is permanently damaged or cannot store normal information. The memory cell having the hard error may be fixed to a data level that data cannot be written again and may not be correctable by the ECC circuit 112.

The controller 110 may be designed to perform an operation corresponding to the type of error occurring in the memory apparatus 120 and the number of error occurrences according to the type of error and the number of error occurrences. Accordingly, the controller 110 may control the type of error to be accurately determined in the error determination circuit 114 and control an operation corresponding to a determination result to be performed.

In an embodiment, the error determination circuit 114 may repeatedly perform a write operation and a read operation on the memory apparatus 120 corresponding to address information in which an error occurs while changing a level of data, and determine that the hard error occurs when the error is detected in the same position.

For example, after the error determination circuit 114 may write and read data having a first level by accessing the memory apparatus 120 corresponding to a corresponding row address based on the address information in which the error occurs, that is, the error occurrence address information, the error determination circuit 114 may determine whether or not the error occurs in the same bit position. When the error occurs in the same bit position, the error determination circuit 114 may further determine whether or not the error occurs in the same bit position by writing and reading data having a second level different from the first level in and from the memory apparatus 120 corresponding to the corresponding row address. When the error occurs in the same bit position as a determination result, the error determination circuit 114 may determine the corresponding error as the hard error. If the error does not occur in the same bit position when the data having the first level is written and read, or if the error does not occur in the same bit position when the data having the second level is written and read, that is, when the error occurrence bit position is changed, the error determination circuit 114 may determine the corresponding error as the soft error.

The memory apparatus 120 may be implemented with a nonvolatile memory (NVM) apparatus. The nonvolatile memory apparatus may be a flash memory, a resistive random access memory (ReRAM), a phase-change RAM (PCRAM), a magnetic RAM (MRAM), and the like, but this is not limited thereto. For example, the memory apparatus 120 may be a memory apparatus in which the level of data stored is determined according to a resistance state of a data storage node.

In an embodiment, the memory apparatus 120 may include at least one nonvolatile memory chip. The memory apparatus 120 may be configured in various structures. For example, a plurality of nonvolatile memory chips may be arranged on the same plane or stacked in a perpendicular direction to a plane of the chip.

The memory apparatus 120 may have a configuration of a conventional nonvolatile memory apparatus. In an embodiment, the memory apparatus 120 may include a plurality of memory cells coupled between a plurality of word lines and a plurality of bit lines. The memory apparatus 120 may further include a circuit unit configured to access the memory cell and write and read data in and from the memory cell such as a row access circuit, a column access circuit, a write circuit, and a read circuit.

Figure 2A:
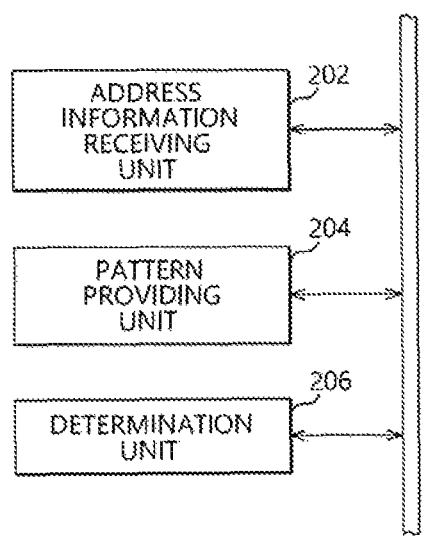
FIGS. 2A and 2B are configuration diagrams illustrating a representation of an example of an error determination circuit according to an embodiment.
Figure 2B:
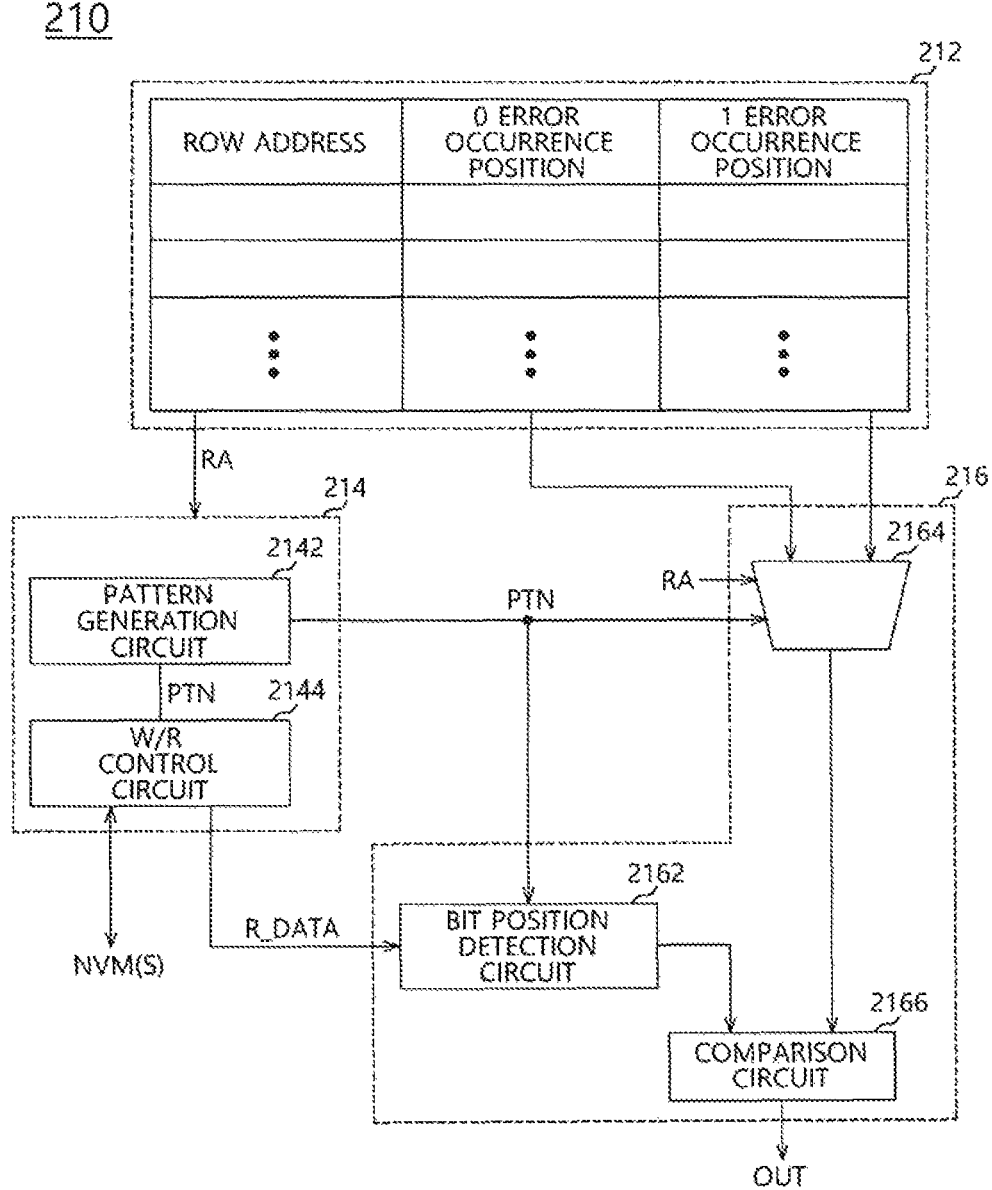

FIGS. 2A and 2B are configuration diagrams illustrating a representation of an example of an error determination circuit according to an embodiment.

Referring to FIG. 2A, an error determination circuit 20 according to an embodiment may include an address information receiving unit 202, a pattern providing unit 204, and a determination unit 206.

The address information receiving unit 202 may be configured to receive address information from the ECC circuit 112. In an embodiment, the ECC circuit 112 may output the error occurrence address information corresponding to an error when the error occurs as an operation result. The error occurrence address information may include, for example, a row address and error bit position information.

As the error occurrence address information is provided to the address information receiving unit 202, the pattern providing unit 204 may control the write operation and the read operation to be repeatedly performed on the memory apparatus 120 corresponding to the corresponding error occurrence address information while changing the level of the data.

The determination unit 206 may receive read data from the memory apparatus 120 corresponding to the corresponding error occurrence address information according to control of the pattern providing unit 204 and determine that the hard error occurs when the error is detected in the same position of the memory apparatus 120.

In an embodiment, the pattern providing unit 204 may write and read the data having the first level by accessing the memory apparatus 120 corresponding to the corresponding row address based on the error occurrence address information received from the address information receiving unit 202.

The determination unit 206 may determine whether or not an error occurs in the same bit position as the bit position received from the address information receiving unit 202 according to a result of the operation that the data having the first level is written and then read, When the error occurs in the same bit position, the pattern providing unit 204 may write and read data having a second level different from the first level in and from the memory apparatus 120 corresponding to the corresponding row address.

The determination unit 206 may determine whether or not the error occurs in the same bit position as the bit position received in the address information receiving unit 202 according to a result of the operation that data having the second level is written and then read.

When the error occurs in the same bit position, the determination unit 206 may determine the corresponding error as the hard error. When the error does not occurs the same bit position as the result of the operation that the data having the first level is written and then read or when the error does not occur in the same bit position as the result of the operation that the data having the second level is written and then read, that is, when the error occurrence bit position is changed, the error determination circuit 114 may determine the corresponding error as the soft error.

When the error is determined as the hard error, the controller 110 may perform a repair operation on the corresponding row address, but this is not limited thereto. When the error is determined as the soft error, the controller 110 may perform a scrubbing or refresh operation on the corresponding row address, an operation of counting the number of error occurrence on the corresponding row address, a repair operation on the corresponding row address, and the like, but this is not limited thereto.

FIG. 2B is a configuration diagram illustrating an error determination circuit according to an embodiment.

Referring to FIG. 2B, an error determination circuit 210 according to an embodiment may include an address information receiving unit 212, a pattern providing unit 214, and a determination unit 216.

The address information receiving unit 212 may be configured to receive address information from the ECC circuit 112. In an embodiment, the address information may include, for example, a row address and error bit position information. The error bit position information may be divided into position information in which an error of a logic low level (0) occurs and position information in which an error of a logic high level (1) occurs. The address information receiving unit 212 may be configured of a register which stores a logic low level (0) error occurrence position and a logic high level (1) error occurrence position for each row address as illustrated in FIG. 2B. The 0 error occurrence position may be position information of a bit in which data of a logic high level (1) is programmed, but the programmed data is read as data of a logic low level (0) in the ECC process. The 1 error occurrence position may be position information of a bit in which data of a logic high level (0) is programmed, but the programmed data is read as data of a logic low level (1) in the ECC process.

The pattern providing unit 214 may include a pattern generation circuit 2142 and a write/read (W/R) control circuit 2144.

The pattern generation circuit 2142 may be configured to generate a data pattern PTN to be written in the memory apparatus 120, for example, data of a logic low level or data of a logic high level.

The W/R control circuit 2144 may be configured to receive a row address RA from the address information receiving unit 212 and the data pattern PTN from the pattern generation circuit 2142. The W/R control circuit 2144 may write and read data in and from a corresponding region of the memory apparatus 120 according to the row address RA and the data pattern PTN.

The data pattern PTN generated in the pattern generation circuit 2142 and read data R_DATA corresponding to the data pattern PTN may be provided to the determination unit 216.

The determination unit 216 may include a bit position detection circuit 2162, a selection circuit 2164, and a comparison circuit 2166.

The bit position detection circuit 2162 may be configured to detect error bit position information based on the data pattern PTN and the read data R_DATA provided from the pattern providing unit 214. In an embodiment, the bit position detection circuit 2162 may be configured to detect a position of a bit having a different level from the data pattern PTN input with respect to a plural bit-read data R_DATA.

The selection circuit 2164 may be configured to detect error bit position information of a corresponding row address RA provided from the address information receiving unit 212 in response to the row address RA and the data pattern PTN. As the address information receiving unit 212 stores the 0 error occurrence position and the 1 error occurrence position, the selection circuit 2164 may be configured to detect the error occurrence position for a complementary level of the data pattern PTN. For example, when the data pattern PTN is a logic high level (1), the selection circuit 2164 may detect the 0 error occurrence position of the corresponding row address RA.

The comparison circuit 2166 may be configured to output a comparison signal OUT according to whether or not an output signal of the bit position detection circuit 2162 is equal to an output signal of the selection circuit 2164.

When the bit position detected in the bit position detection circuit 2162 is equal to the error occurrence position output from the selection circuit 2164, the error determination circuit 210 may change a level of the data pattern PTN and repeatedly perform the above-described operation.

When an error occurs in the same bit position as a result of performing data read and write while changing the data pattern PTN, the error determination circuit 210 may determine the corresponding error as a hard error. When an error does not occur in the same bit position as the result of performing data read and write while changing the data pattern PTN, the error determination circuit 210 may determine the corresponding error as a soft error.

Figure 3:
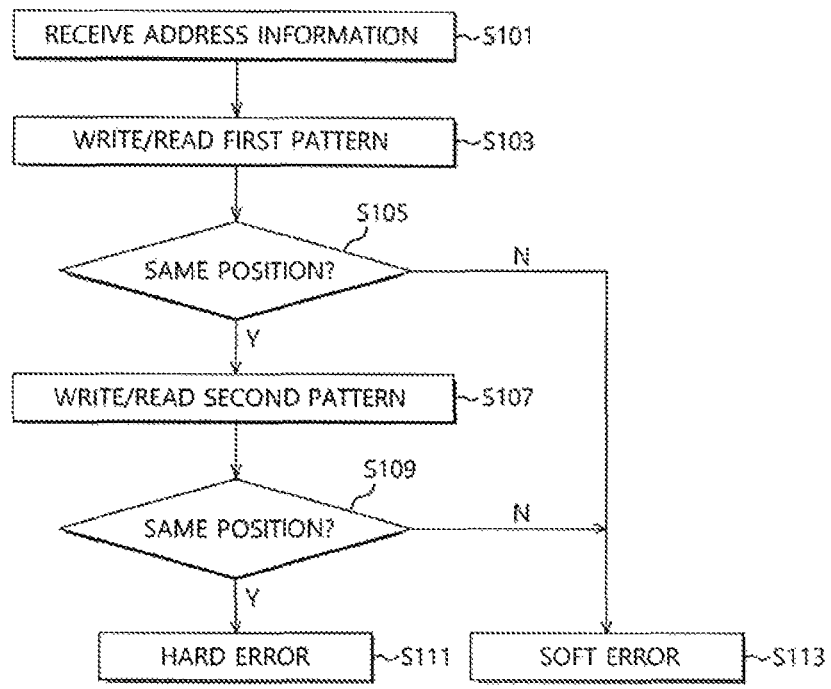
FIG. 3 is a flowchart for explaining an error determination method according to an embodiment.

FIG. 3 is a flowchart for explaining an error determination method according to an embodiment.

As the error occurrence address information is output as the operation result of the ECC circuit 112, the error determination circuit 114 and 20 may receive the error occurrence address information (S101). The error occurrence address information may include, for example, the row address and the bit position information.

The error determination circuit 114 and 20 may write and read data having the first level in and from a corresponding region of the memory apparatus 120 according to the row address included in the received error occurrence address information (S103).

Then the error determination circuit 114 and 20 may determine whether or not an error occurs in the same bit position based on a result of the operation that the data having the first level is written and read (S105).

When the error occurs in the same bit position as a determination result in operation S105, the error determination circuit 114 and 20 may write and read data having a second level in and from the corresponding region of the memory apparatus 120 corresponding to the corresponding row address (S107).

The error determination circuit 114 and 20 may determine whether or not an error occurs in the same bit position based on a result of the operation that the data having the second level is written and read (S109).

When the error occurs in the same bit position as a determination result in operation S109, the error determination circuit 114 and 20 may determine the corresponding error as the hard error (S111).

When the error does not occur in the same bit position as the result of the operation that the data having the first level is written and read or when the error does not occur in the same bit position as the result of the operation that the data having the second level is written and read, the error determination circuit 114 and 20 may determine the corresponding error as the soft error (S113).

As described above, in an embodiment, when an error occurs, the nonvolatile memory system may repeatedly determine an error occurrence position and when the error continuously occurs in the same bit position, the nonvolatile memory system may determine the error as the hard error. Accordingly, the nonvolatile memory system may clearly divide the error of the memory apparatus 120 as the soft error or the hard error.

When the memory apparatus 120 is configured of a PCRAM, a plurality of memory cells constituting the memory apparatus 120 may represent resistance drift that a resistance of a phase-change material changed to a high-resistance state due to various factors.

When a normal reference voltage Vref_mid which is applied in a normal read operation is applied to a read operation for determining a type of error, data in the memory cells which are changed to the high-resistance state due to the resistance drift may not be accurately read.

Accordingly, after the memory cell is written in a high-resistance state, the nonvolatile memory system may perform a read operation using a first reference voltage Vref_upper by adjusting the normal reference voltage to be increased. Similarly, after the memory cell is written in a low-resistance state, the nonvolatile memory system may perform a read operation using a second reference voltage Vref_lower by adjusting the normal reference voltage to be reduced.

Figure 4:
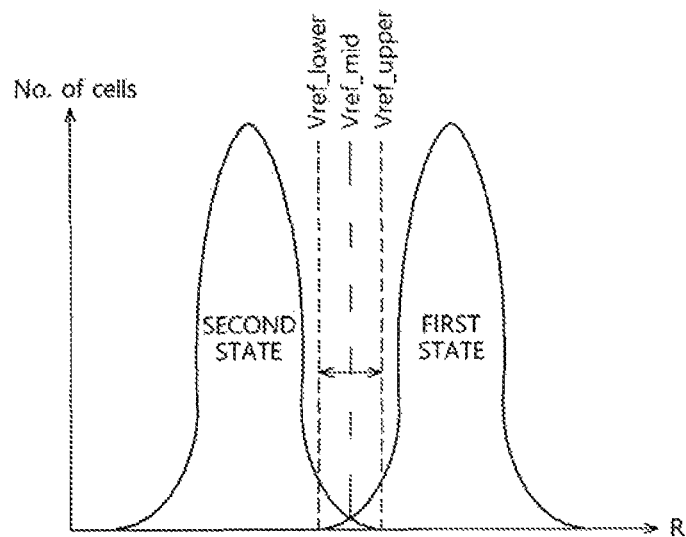
FIG. 4 is a conceptual diagram for explaining an error determination condition according to an embodiment.

FIG. 4 is a conceptual diagram for explaining an error determination condition according to an embodiment.

Referring to FIG. 4, a first state may represent a high-resistance state, and a second state may represent a low-resistance state.

With respect to the memory cells which are written to have the first state, the nonvolatile memory system may perform the read operation by applying the first reference voltage Vref_upper larger than the normal reference voltage Vref_mid. Accordingly, the nonvolatile memory system may accurately read data of the memory cells which are written to have the first state and are changed to the high-resistance state.

With respect to memory cells which are written to have the second state, the nonvolatile memory system may perform the read operation by applying the second reference voltage Vref_lower smaller than the normal reference voltage Vref_mid. Accordingly, the nonvolatile memory system may divide a memory cell (or memory cells), that the data level cannot be determined by the normal reference voltage Vref_mid among the memory cells which are written to have the second state and are changed to the low-resistance state, as a memory cell (or memory cells) in which an error occurs. In an embodiment, the normal read operation may apply the normal reference voltage Vref_mid with respect to the memory cells being read.

The nonvolatile memory system may further accurately detect whether or not the error occurs in the memory apparatus 120 through the rigid setup of the read condition as described above.

When the error is determined as the soft error as the read result by the rigid condition, the lifespan of the corresponding memory cells may extend through avoidance of access to the corresponding address.

When the error is determined as the soft error as the read result by the rigid condition, the lifespan according to the resistance drift of the cell may be expected. The reliability of the memory apparatus 120 may be improved by adjusting the reference voltage in the normal read operation by the reflecting the resistance drift of the cell.

Figure 5:
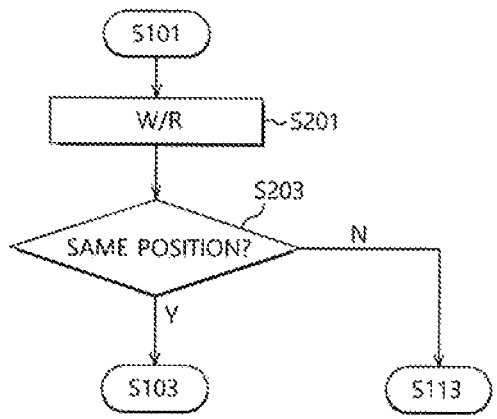
FIG. 5 is a flowchart for explaining an error determination method according to an embodiment.

FIG. 5 is a flowchart for explaining an error determination method according to an embodiment.

After the error occurrence address information is received from the ECC circuit 112 (S101) as illustrated in FIG. 3, a pre-determination process may be performed before the error determination process is performed, and the pre-determination process is illustrated in FIG. 5.

For the pre-determination process, the error determination circuit 114 and 20 may write and read the same data as data output in the normal read operation in the memory apparatus 120 corresponding to a corresponding row address (S201).

The error determination circuit 114 and 20 may determine whether or not an error occurs in the same bit position as a read result in operation S201 (S203).

When the error occurs in the same bit position as a determination result in operation S203, the error determination circuit 114 and 20 may proceed to operation S103 and perform the repetitive determination process. That is, while changing the level of the data, the error determination circuit may repeatedly perform the write operation and the read operation on the error occurrence address information, and determine that the hard error occurs when the error is detected in the same bit position.

When the error does not occur in the same bit position as the determination result in operation S203, the error determination circuit 114 and 20 may determine the corresponding error as the soft error (S113).

In an embodiment illustrated in FIG. 5, the soft error may be filtered through the pre-determination process before the repetitive determination process as illustrated in FIG. 3, and thus the processing load of the nonvolatile memory system 10 may be reduced.

FIGS. 6 to 10 are configuration diagrams illustrating examples of a representation of an electronic apparatus according to various embodiments of the present technical spirit.

Figure 6:
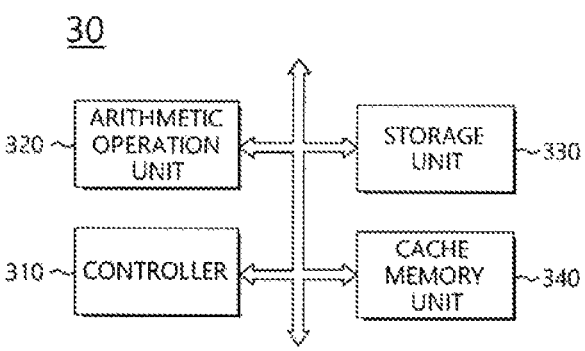
FIGS. 6 to 10 are configuration diagrams illustrating examples of a representation of an electronic apparatus according to various embodiments of the present technical spirit.

FIG. 6 is a configuration diagram illustrating an example of a representation of a processor as an electronic apparatus according to an embodiment of the present technical spirit.

Referring to FIG. 6, a processor 30 may include a controller 310, an arithmetic operation unit 320, a storage unit 330, and a cache memory unit 340.

The controller 310 may control an overall operation of the processor 30 such as operations of decoding a command, performing data input or data output, other processing, and the like by receiving a signal such as the command or data from an external apparatus.

The arithmetic operation unit 320 may perform several arithmetic operations according to a decoding result of the command in the controller 310. The arithmetic operation unit 320 may include at least one arithmetic and logic unit (ALU), but this is not limited thereto.

The storage unit 330 may serve as a register, and may be a data storage part in the inside of the processor 30. The storage unit 330 may include a data register, an address register, a floating-point register, and other various registers. The storage unit 330 may store addresses in which data operated in the arithmetic operation unit 220, data according to an operation result, and data to be processed in the arithmetic operation unit 220 are stored.

The storage unit 330 may be formed of a nonvolatile memory apparatus, and the controller 310 may include the ECC circuit 112 and the error determination circuit 114 as illustrated in FIG. 1. Accordingly, the error determination circuit 114 may accurately divide whether an error is the soft error or the hard error based on the error occurrence address information generated in the ECC circuit 112.

The cache memory unit 340 may serve as a temporary storage space.

The processor 30 illustrated in FIG. 6 may be a central processing unit (CPU) of an electronic apparatus, a graphic processing unit (GPU), a digital signal processor (DSP), an application processor (AP), and the like.

Figure 7:
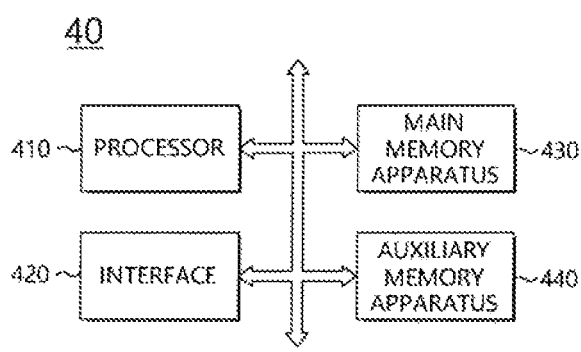
Figure 8:
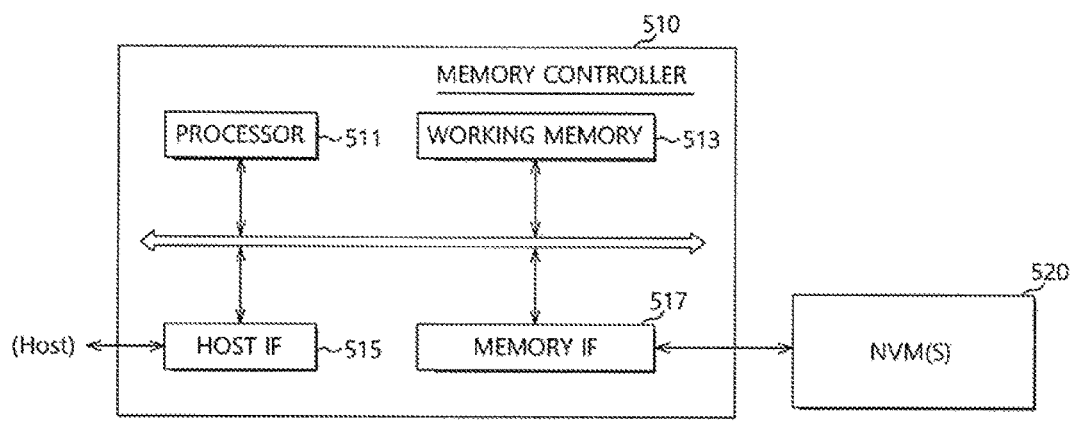

FIGS. 7 and 8 are configuration diagrams illustrating examples of a representation of a data processing system as an electronic apparatus according to various embodiments of the present technical spirit.

A data processing system 40 illustrated in FIG. 7 may include a processor 410, an interface 420, a main memory apparatus 430, and an auxiliary memory apparatus 440.

The data processing system 40 may perform input, processing, output, communication, storage, and the like to perform a series of operations for data processing, and may be an electronic apparatus such as a computer server, a personal portable terminal, a portable computer, a web tablet computer, a wireless terminal, a mobile communication terminal, a digital content player, a camera, a satellite navigation system, a video camera, a tape recorder, a telematics device, an audio/video (AV) system, or a smart television (TV).

In an embodiment, the data processing system 40 may be a data storage apparatus. The data processing system 40 may be a disc type storage apparatus such as a hard disc, an optical drive, a solid state disc, or a digital versatile disc (DVD) or a card type storage apparatus such as a universal serial bus (USB) memory, a secure digital (SD) card, a memory stick, a smart media card, internal/external multimedia cards, or a compact flash card.

The processor 410 may exchange data between the main memory apparatus 430 and an external apparatus (not illustrated) through the interface 420, and the processor 410 may perform an overall control such as decoding of commands input from the external apparatus through the interface 320 and an operation or comparison of data stored in the system.

The interface 420 may provide an environment that a command and data are exchangeable between an external apparatus and the data processing system 40. The interface 420 may be a man-machine interface apparatus which includes an input apparatus (for example, a keyboard, a keypad, a mouse, a voice recognition apparatus, and the like) and an output apparatus (for example, a display, speaker, and the like) or a card interface apparatus or a disc interface apparatus (for example, Integrated Drive Electronics (IDE), Small Computer System Interface (SCSI), Serial Advanced Technology Attachment (SATA), External SATA (eSATA), Personal Computer Memory Card International Association (PCMCIA), and the like) according to an application environment of the data processing system 40.

The main memory apparatus 430 may store an application, a control signal, data, and the like required for an operation of the data processing system 40, and may serve as a storage space which may transfer and execute program or data from the auxiliary storage apparatus 440. The main memory apparatus 430 may be implemented using a nonvolatile memory apparatus.

The auxiliary memory apparatus 440 may be a space for storage of a program code, data, and the like, and may be a high-capacity memory apparatus. For example, the auxiliary memory apparatus 440 may be implemented using a nonvolatile memory apparatus.

The processor 410 may control the error determination circuit 114 to accurately divide whether an error in the main memory apparatus 430 or the auxiliary memory apparatus 440 is the soft error or the hard error based on the error occurrence address information generated in the ECC circuit 112.

A data processing system 50 illustrated in FIG. 8 may include a memory controller 510 and a nonvolatile memory (NVM) apparatus 520.

The memory controller 510 may be configured to access the nonvolatile memory apparatus 520 in response to a request from a host. The memory controller 510 may include a processor 511, a working memory 513, a host interface 515, and a memory interface 517.

The process 511 may be configured to control an overall operation of the memory controller 510. The working memory 513 may store an application, data, a control signal, and the like required for the operation of the memory controller 510.

The host interface 515 may perform protocol conversion for exchange of data and a control signal between the host and the memory controller 510, and the memory interface 517 may perform protocol conversion for exchange of data and a control signal between the memory controller 510 and the nonvolatile memory apparatus 520.

In an embodiment, the nonvolatile memory apparatus 520 and/or the working memory 513 may be configured by employing the nonvolatile memory system 10 illustrated in FIG. 1.

In an embodiment, the memory controller 510 may include an ECC circuit and an error determination circuit. The memory controller 510 may control the error determination circuit to accurately divide whether an error in the working memory 513 or the nonvolatile memory apparatus 520 is the soft error or the hard error based on the error occurrence address information generated in the ECC circuit.

The data processing system 50 illustrated in FIG. 8 may be used as a disc apparatus or internal/external memory cards of a portable electronic apparatus. The data processing system may be used as an image processor and other application chipsets.

Figure 9:
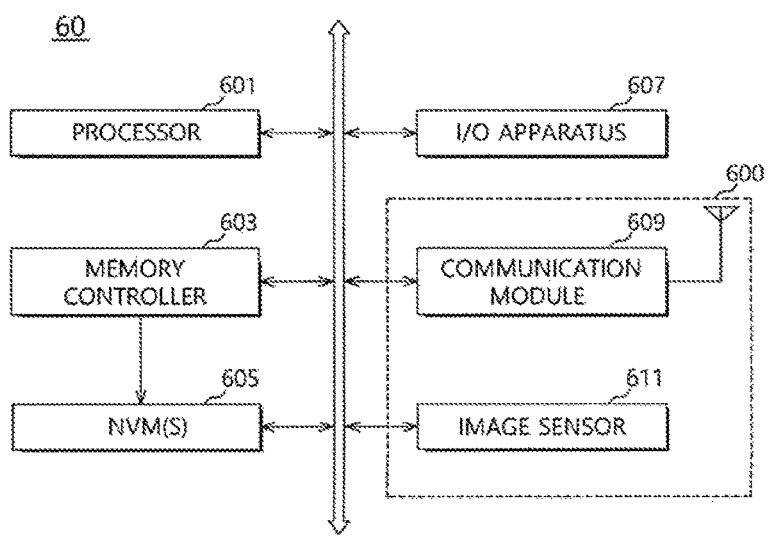
Figure 10:
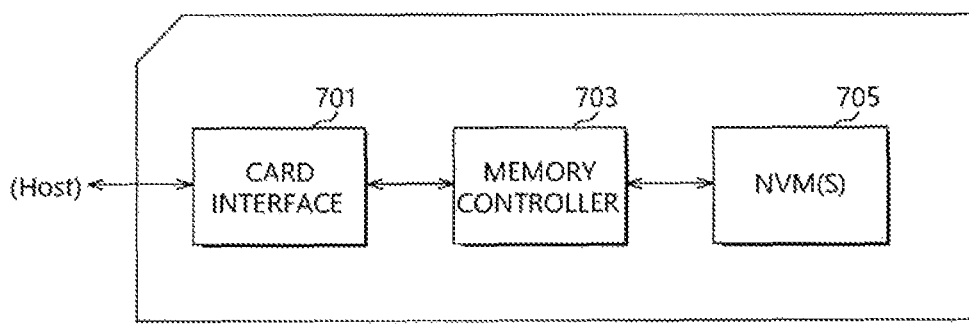

FIGS. 9 and 10 are configuration diagrams illustrating other examples of a representation of an electronic apparatus according to various embodiments of the present technical spirit.

An electronic apparatus 60 illustrated in FIG. 9 may include a processor 601, a memory controller 603, a nonvolatile memory apparatus 605, an input/output (I/O) apparatus 607, and a function module 600.

The memory controller 603 may control a data processing operation, for example, a write operation, a read operation, and the like of the nonvolatile memory apparatus 605 according to control of the processor 601.

Data programmed in the nonvolatile memory apparatus 605 may be output through the I/O apparatus 607 according to control of the processor 601 and the memory controller 603. For example, the I/O apparatus 607 may include a display apparatus, a speaker apparatus, and the like.

The I/O apparatus 607 may also include an input apparatus, and the I/O apparatus 607 may input a control signal for controlling an operation of the processor 601 or data to be processed in the processor 601 through the input apparatus.

In another embodiment, the memory controller 603 may be implemented with a portion of the processor 601 or a separate chipset from the processor 601.

The memory controller 603 may be implemented, for example, with the controller 110 illustrated in FIG. 1. Accordingly, the memory controller 603 may control the error determination circuit to accurately divide whether an error in the nonvolatile memory apparatus 605 is the soft error or the hard error based on the error occurrence address information generated in the ECC circuit.

The function module 600 may be a module which may perform a function selected according to an application example of the electronic apparatus 60 illustrated in FIG. 9, and a communication module 609 and an image sensor 611 as an example of the function module 600 are illustrated in FIG. 9.

The communication module 609 may provide a communication environment that the electronic apparatus 60 is coupled to a wired or wireless communication network to exchange data and a control signal.

The image sensor 611 may convert an optical image to digital image signals and transfer the digital image signals to the processor 601 and the memory controller 603.

When the function module 600 includes the communication module 609, the electronic apparatus 60 of FIG. 9 may be a portable communication apparatus such as a wireless communication terminal. When the function module 600 may include the image sensor 611, the electronic apparatus 60 may be a digital camera, a digital camcorder, or an electronic system (for example, a personal computer (PC), a laptop computer, a mobile communication terminal, and the like) to which any one of the digital camera and the digital camcorder is attached.

The electronic apparatus 60 may also include both the communication module 609 and the image sensor 611.

An electronic apparatus 70 illustrated in FIG. 10 may include a card interface 701, a memory controller 703, and a nonvolatile memory apparatus 705.

FIG. 10 is an illustrative diagram illustrating the electronic apparatus 70 used as a memory card or a smart card, and the electronic apparatus 70 illustrated in FIG. 10 may be any one among a PC card, a multimedia card, an embedded multimedia card, a secure digital card, and a universal serial bus (USB) drive.

The card interface 701 may perform interacting on data exchange between a host and the memory controller 703 according to a protocol of the host. In an embodiment, the card interface 701 may refer to hardware which may support a protocol used in the host, software installed in the hardware which may support the protocol used in the host, or a signal transmission method.

The memory controller 703 may control data exchange between the nonvolatile memory apparatus 705 and the card interface 701.

The memory controller 703 may be implemented, for example, with the controller 110 illustrated in FIG. 1. Accordingly, the memory controller 703 may control the error determination circuit to accurately divide whether an error in the nonvolatile memory apparatus 705 is the soft error or the hard error based on the error occurrence address information generated in the ECC circuit.

The above embodiments are illustrative and not limitative. Various alternatives and equivalents are possible. The present disclosure is not limited by the embodiments described herein. Nor is the present disclosure limited to any specific type of semiconductor device. Other additions, subtractions, or modifications are obvious in view of the present disclosure and are intended to fall within the scope of the appended claims.

What is claimed is:

1. A nonvolatile memory system comprising:
a memory apparatus including a plurality of nonvolatile memory cells; and
a controller configured to control a write operation and a read operation with respect to the memory apparatus, detect an error occurrence position by repeatedly performing the write operation and the read operation on a corresponding region of the memory apparatus in which an error occurs based on error occurrence address information generated in the read operation while changing a level of data to be written, and determine a type of error based on the detected error occurrence position,
wherein the nonvolatile memory apparatus is a phase-change random access memory (PCRAM), and
the controller is configured to detect the error occurrence position by writing data having a first level in the corresponding region of the memory apparatus and firstly reading the data having the first level using a first reference voltage based on the error occurrence address information, detect the error occurrence position by writing data having a second level in the corresponding region of the memory apparatus and secondarily reading the data having the second level using a second reference voltage when the error occurs in the same bit position as position information included in the error occurrence address information as a first read result, and determine the error as a hard error when the error occurs in the same bit position as a second read result.

2. The nonvolatile memory system of claim 1,
wherein the controller is configured to determine the error as a soft error when the error does not occur in the same bit position as the result of the operation that the data having the first level is written and read, and
wherein the controller is configured to determine the error as a soft error when the error does not occur in the same bit position as the result of the operation that the data having the second level is written and read.

3. The nonvolatile memory system of claim 1, wherein the data having the first level is data which is written in the PCRAM with a high-resistance state, and the first reference voltage is set to have a higher level than a reference voltage of a normal read operation.

4. The nonvolatile memory system of claim 1, wherein the data having the second level is data which is written in the PCRAM with a low-resistance state, and the second reference voltage is set to have a lower level than a reference voltage of a normal read operation.

5. A nonvolatile memory system comprising:
an error checking and correction (ECC) circuit configured to generate error occurrence address information according to a read result of a nonvolatile memory apparatus; and
an error determination circuit configured to receive the error occurrence address information, detect an error occurrence position by repeatedly performing a write operation and a read operation on the nonvolatile memory apparatus corresponding to the error occurrence address information while changing a level of data to be written, and determine a type of error based on the detected error occurrence position,
wherein the nonvolatile memory apparatus is a phase-change random access memory (PCRAM), and
the pattern providing unit is configured to write data having a first level with respect to the nonvolatile memory apparatus corresponding to the error occurrence address information and firstly read the data having the first level using a first reference voltage and to write data having a second level with respect to the nonvolatile memory apparatus corresponding to the error occurrence address information and secondarily read the data having the second level using a second reference voltage based on a determination result of the determination unit.

6. The nonvolatile memory system of claim 5, wherein the error determination circuit includes:
an address information receiving unit configured to receive the error occurrence address information;
a pattern providing unit configured to repeatedly perform the write operation and the read operation on the nonvolatile memory apparatus corresponding to the error occurrence address information while changing the level of the data; and
a determination unit configured to determine the type of error by detecting the error occurrence position based on the read operation of the pattern providing unit.

7. The nonvolatile memory system of claim 6, wherein the pattern providing unit is configured to write and read data having a first level with respect to the nonvolatile memory apparatus corresponding to the error occurrence address information, and write and read data having a second level with respect to the nonvolatile memory apparatus corresponding to the error occurrence address information based on a determination result of the determination unit.

8. The nonvolatile memory system of claim 5, wherein the data having the first level is data which is written in the PCRAM with a high-resistance state, and the first reference voltage is set to have a higher level than a reference voltage of a normal read operation.

9. The nonvolatile memory system of claim 5, wherein the data having the second level is data which is written in the PCRAM with a low-resistance state, and the second reference voltage is set to have a lower level than a reference voltage of a normal read operation.

10. An error determination method of a nonvolatile memory system which includes a controller and a memory apparatus, the method comprising:
reading data from the memory apparatus according to control of the controller in a normal read operation;
generating error occurrence address information based on a read result in the controller; and
detecting an error occurrence position by repeatedly performing a write operation and a read operation on a corresponding region of the memory apparatus in which an error occurs in the controller based on the error occurrence address information while changing a level of data to be written and determining a type of error based on the detected error occurrence position,
wherein the memory apparatus is a phase-change random access memory (PCRAM), and
the determining of the type of error includes:
detecting the error occurrence position by writing data having a first level in the corresponding region of the memory apparatus and firstly reading the data having the first level using a first reference voltage based on the error occurrence address information;
detecting the error occurrence position by writing data having a second level in the corresponding region of the memory apparatus and secondarily read the data having the second level using a second reference voltage when the error occurs in the same bit position as position information included in the error occurrence address information as a first read result; and
determining the error as a hard error when the error occurs in the same bit position as a second read result.

11. The method of claim 10, wherein the determining of the type of error includes:
determining the error as a soft error when the error does not occur in the same bit position as the result of the operation that the data having the first level is written and read, and
determining the error as a soft error when the error does not occur in the same bit position as the result of the operation that the data having the second level is written and read.

12. The method of claim 10, wherein the data having the first level is data which is written in the PCRAM with a high-resistance state, and the first reference voltage is set to have a higher level than a reference voltage of the normal read operation.

13. The method of claim 10, wherein the data having the second level is data which is written in the PCRAM with a low-resistance state, and the second reference voltage is set to have a lower level than a reference voltage of the normal read operation.

14. The method of claim 10, further comprising, after the generating of the error occurrence address information, writing the same data as data output in the normal read operation with respect to the corresponding region of the memory apparatus in which the error occurs and reading the data in advance in the controller, and repeatedly performing the determining when an error occurs in the same bit position as position information included in the error occurrence address information as a previous read result.

* * * * *